US011272247B2

(12) United States Patent
Menon (10) Patent No.: US 11,272,247 B2
(45) Date of Patent: Mar. 8, 2022

(54) MULTI-MODE CONVERSION OF MULTIPLE VIDEO STREAMS

(71) Applicant: DISH Wireless L.L.C., Englewood, CO (US)

(72) Inventor: Anand Menon, Lone Tree, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/911,216

(22) Filed: Jun. 24, 2020

(65) Prior Publication Data

US 2021/0409816 A1    Dec. 30, 2021

(51) Int. Cl.
| | |
|---|---|
| *H04N 7/16* | (2011.01) |
| *H04N 21/4402* | (2011.01) |
| *H04N 21/44* | (2011.01) |
| *H04N 21/442* | (2011.01) |
| *H04N 21/643* | (2011.01) |

(52) U.S. Cl.
CPC ... *H04N 21/4402* (2013.01); *H04N 21/44004* (2013.01); *H04N 21/44209* (2013.01); *H04N 21/643* (2013.01)

(58) Field of Classification Search
CPC ............. H04N 21/4402; H04N 21/643; H04N 21/44209; H04N 21/44004
USPC .......................................................... 725/139
See application file for complete search history.

(56) References Cited

U.S. PATENT DOCUMENTS

| | | | | |
|---|---|---|---|---|
| 6,543,051 | B1 * | 4/2003 | Manson ............... | G08B 27/008 348/461 |
| 6,684,240 | B1 * | 1/2004 | Goddard ................ | H04N 7/163 348/E7.061 |
| 7,602,277 | B1 * | 10/2009 | Daly .................... | G08B 27/005 340/438 |
| 7,643,564 | B2 * | 1/2010 | Sheynman ......... | H04N 21/4627 375/259 |
| 7,681,215 | B2 * | 3/2010 | Kim ........................ | H04N 5/50 725/33 |
| 7,870,279 | B2 * | 1/2011 | Chuang ................. | H04L 65/602 709/231 |
| 8,745,655 | B2 * | 6/2014 | Reddy ................ | H04N 21/4882 725/31 |
| 9,106,976 | B2 * | 8/2015 | Emerson ............ | H04N 21/4627 |
| 2001/0021994 | A1 * | 9/2001 | Nash .................... | H04H 20/106 725/42 |

(Continued)

OTHER PUBLICATIONS

PCT/US2021/038773 International Search Report and Written Opinion dated Jul. 20, 2021, 8 pgs.

*Primary Examiner* — Michael B. Pierorazio
(74) *Attorney, Agent, or Firm* — Perkins Cole LLP (57) ABSTRACT

A technique is described for converting a variety of video streams from transmission sources into a single designated video stream on a client device. As an example, a converter device may receive video streams from multiple transmission sources and select the video stream to convert and output on a client device based on the signal quality. In some examples, the converter device may switch between transmission sources. The converter device may measure the time offset between the video streams of the transmission sources and buffer one of the video streams to align the timing of the video streams, so the user does not detect a timing delay while viewing the video content.

17 Claims, 7 Drawing Sheets

(56) References Cited

U.S. PATENT DOCUMENTS

| | | | |
|---|---|---|---|
| 2002/0083468 A1* | 6/2002 | Dudkiewicz | H04N 21/4755 725/133 |
| 2002/0124252 A1* | 9/2002 | Schaefer | H04N 21/4722 725/33 |
| 2002/0129368 A1* | 9/2002 | Schlack | H04N 21/4661 725/46 |
| 2002/0188944 A1* | 12/2002 | Noble | H04N 21/26241 725/39 |
| 2002/0188949 A1* | 12/2002 | Wang | H04N 5/44543 725/46 |
| 2003/0018977 A1* | 1/2003 | McKenna | H04N 21/4828 725/115 |
| 2003/0066069 A1* | 4/2003 | Mankovich | H04N 21/235 725/9 |
| 2003/0216133 A1* | 11/2003 | Poltorak | G08B 27/008 455/404.1 |
| 2005/0055685 A1* | 3/2005 | Maynard | H04N 21/8193 717/170 |
| 2005/0086685 A1* | 4/2005 | Rahman | H04L 29/06 725/33 |
| 2005/0163223 A1* | 7/2005 | Klamer | H04N 21/6125 375/240.25 |
| 2006/0031889 A1* | 2/2006 | Bennett | H04L 65/607 725/80 |
| 2006/0234672 A1* | 10/2006 | Adler | H04W 4/029 455/404.1 |
| 2007/0047520 A1* | 3/2007 | Byers | H04M 7/006 370/352 |
| 2007/0121651 A1* | 5/2007 | Casey | H04L 67/2823 370/401 |
| 2007/0150273 A1* | 6/2007 | Yamamoto | G10L 15/22 704/231 |
| 2007/0280446 A1* | 12/2007 | Hsieh | H04L 12/66 379/93.23 |
| 2008/0134043 A1* | 6/2008 | Georgis | H04L 67/104 715/733 |
| 2008/0235733 A1* | 9/2008 | Heie | H04N 7/17318 725/46 |
| 2009/0150925 A1* | 6/2009 | Henderson | H04N 21/4886 725/34 |
| 2009/0158382 A1* | 6/2009 | Shaffer | H04H 60/06 725/131 |
| 2009/0217324 A1* | 8/2009 | Massimi | H04N 21/42203 725/46 |
| 2009/0239497 A1* | 9/2009 | Sennett | H04W 76/50 455/404.1 |
| 2009/0247110 A1* | 10/2009 | Sennett | H04H 20/71 455/404.1 |
| 2009/0247114 A1* | 10/2009 | Sennett | H04W 4/90 455/404.1 |
| 2009/0247116 A1* | 10/2009 | Sennett | H04W 4/024 455/404.2 |
| 2009/0300695 A1* | 12/2009 | White | H04N 21/4227 725/109 |
| 2010/0058395 A1* | 3/2010 | Goergen | H04N 21/44222 725/58 |
| 2010/0060789 A1* | 3/2010 | Aoki | H04N 21/431 348/563 |
| 2010/0186029 A1* | 7/2010 | Kim | H04H 20/33 725/33 |
| 2011/0088058 A1* | 4/2011 | Velazquez | H04N 21/64322 725/33 |
| 2011/0126251 A1* | 5/2011 | LaFreniere | H04N 7/17327 725/110 |
| 2011/0126257 A1* | 5/2011 | Goergen | H04N 21/4316 725/132 |
| 2011/0131604 A1* | 6/2011 | Van Hoff | H04N 21/858 725/38 |
| 2012/0102522 A1* | 4/2012 | Long | H04W 76/50 725/33 |
| 2013/0274936 A1* | 10/2013 | Donahue | H02J 13/00028 700/291 |
| 2013/0281047 A1* | 10/2013 | Daly | H04W 76/50 455/404.1 |
| 2014/0148116 A1* | 5/2014 | Alman | H04L 67/2828 455/404.1 |
| 2014/0244997 A1* | 8/2014 | Goel | H04W 12/084 713/155 |
| 2014/0337901 A1* | 11/2014 | Phillips | H04N 21/4334 725/88 |
| 2016/0277133 A1* | 9/2016 | Stewart | H04N 21/2365 |
| 2016/0295300 A1* | 10/2016 | Alman | H04H 60/51 |

\* cited by examiner

MULTI-MODE CONVERSION OF MULTIPLE VIDEO STREAMS

BACKGROUND

Presently, a variety of video distributers may provide viewing content to users. For example, a user may view content from the internet, digital television, cellular networks, cable networks, or satellite networks. However, each video distributer may have their own equipment, requiring a user to have to purchase a variety of equipment to view content from each video distributer.

DETAILED DESCRIPTION

Techniques that provide for real-time conversion of data transmitted by a content provider via multiple services, including over-the-air (OTA), over-the-top (OTT), Internet, cable, satellite, and wireless services is provided.

A user may view content and data from a content provider by utilizing a content-delivery service that transmits the content and data via one or more physical transports. In an embodiment, a converting device may switch services, (e.g., switching between inputs from satellite to 5G), while the user streams similar or different content. Switching between inputs may cause a time offset between the content streamed by each input source, resulting in poor user experience due to latencies. The converting device may account for the timing offset between the inputs, so the user does not notice a difference while streaming the viewing content. The converting device may measure the signal quality or strength of the inputs and determine if an input should be delayed, or not, potentially resulting in aligning the delivery and/or consumption of video content during the switch between inputs.

Thus, an embodiment includes a multi-mode converter device that aggregates a variety of video distributers and displays content.

Figure 1:
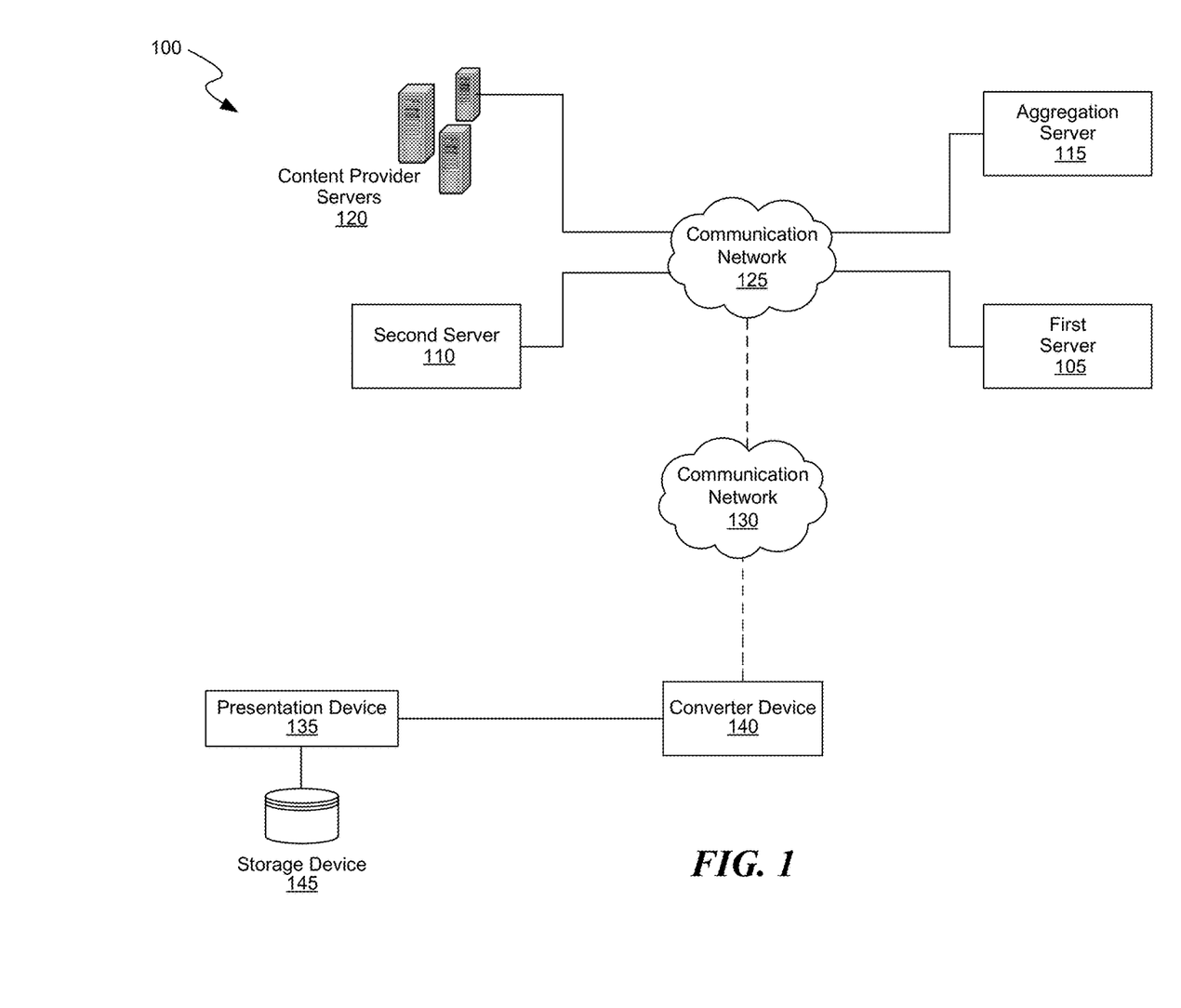
FIG. 1 is a schematic diagram showing a logical system architecture, in accordance with an embodiment.

In FIG. 1, a schematic diagram illustrates a logical system architecture 100. A user presentation device 135 (e.g., a smartphone, tablet, television, computer, game console, etc.) executes an application that communicates with one or more other devices via one or more protocols. As shown, presentation device 135 is operatively connected via wireless or wired connection to a converter device 140 (e.g., multi-mode conversion device). Converter device 140, receives input streams from the communications network 130, processes and transmits the stream into the UI on the screen of the presentation device 135.

The presentation device 135 may receive program content from converter device 140 and simultaneously display or store the same or different program content, e.g., including storage of program content in a storage device 145. In an embodiment, each of the components discussed above (presentation device 135, converter device 140, and storage device 145) can be local, for example, operatively communicating within a local area network (LAN). In other embodiments, one or more of the components may reside in a remote location, yet, the grouping of these components may be considered logically-related. For instance, the storage device 145 could reside at another location (e.g., in the cloud) and still be considered the local storage for the presentation device 135 and converter device 140. Presentation device 135 and converter device 140 each communicate with remote components (e.g., in the cloud) through a local communications network 130. Communication network 130 can be a physically- and/or wirelessly-connected LAN or can be a logical network that represents a combination of networks. For example, presentation device 135 and converter device 140 may communicate through different network(s) despite sharing a physical location within the same building.

In an embodiment, communication network 130 is communicably connected with components in the cloud via a network shown as communication network 125. As with communication network 130, communication network 125 can be a single network or can be a logical single network that represents a combination of networks achieving the same result. The converter device 140 may have digital video recorder (DVR) capabilities. The capabilities may include providing cloud or remote server(s) DVR (e.g., utilizing Google Drive™, Microsoft Azure™, Dropbox™ or other branded-cloud storage service offerings) and local server OTA DVR, thereby providing a seamless user experience. The converter device 140 may be powered by various sources, including a direct electric power connection or batteries.

A cloud DVR backend server is represented by first server 105. In an embodiment, DVR backend server 105 is configured to provide DVR related functionality, such as but not limited to creating and/or deleting the local DVR profile for the user, merging local and remote DVR records to provide a unified recording list, creating a new recording event as a future recording, recording of programs, updating existing future recording states (e.g., recording-in-progress, completed recording(s)), and deleting DVR recordings. DVR backend server 105 is communicably connected via communication network 125 with an aggregation server 115. Aggregation server 115 aggregates metadata from various cloud- and local-servers and their respective service information to create unified metadata that can be obtained from the end user's device (e.g., presentation device 135). Aggregation server 115 may be configured to list the media content to the end user in a unified view. In an embodiment, aggregation server 115 helps overcome the problem of the generic streaming application by unifying the metadata so that such unified data can be sorted in a user-preferred order, as described in detail hereinbelow. While aggregation server 115 is shown as a separate component, it should be appreciated that such depiction is a logical depiction that is not meant to be limiting. For example, aggregation server 115 may reside within or be a part of first server 105. In an embodiment, a second server 110 is communicably connected to a first server 105 via communication network 125. In an embodiment, converter device 140 updates its recordings, schedules, and other information to first server 105 by utilizing a second server 110. In an embodiment, second server 110 is a Compartmented Mode Workstation (CMW). Utilizing a CMW permits the DVR backend to receive, store, and promulgate local changes, as described in further detail herein. Also depicted are the content provider servers 120 that source the media content such as video and audio. Content provider servers 120 represent, but are not limited to, content from OTT and on-demand channels.

Figure 2:
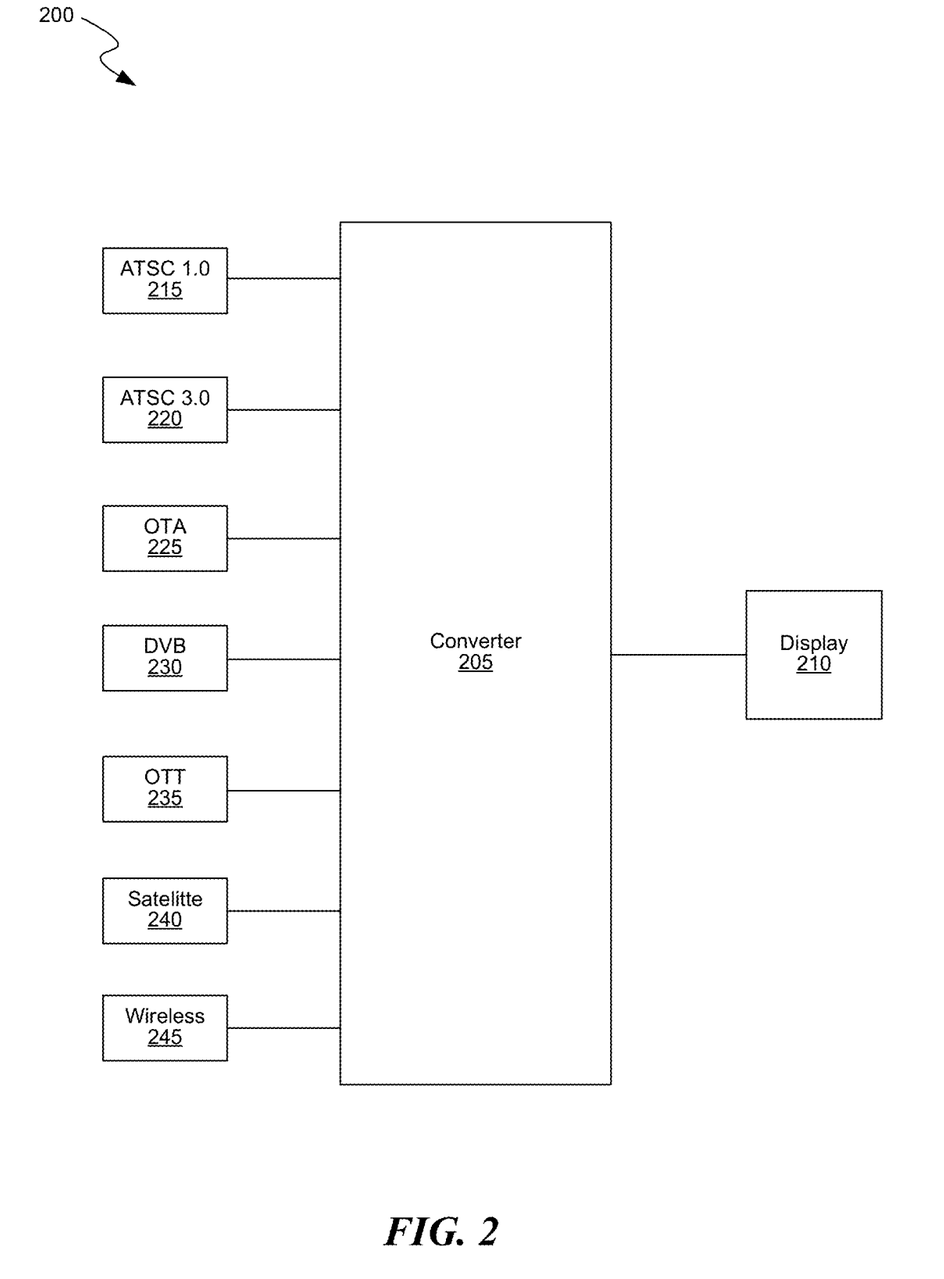
FIG. 2 is a schematic diagram showing the devices of the multi-mode conversion process, according to an embodiment.

FIG. 2 illustrates an embodiment of converter device in a system 200. Converter device 205 may receive data transmitted in compliance with a video-distribution protocol and/or service (e.g., ATSC 1.0 215, ATSC 3.0 220, OTA 225, DVB 230, or OTT 235). The data may be received via one or more distribution or connectivity (e.g., satellite 240, or wireless 245) sources. The data may be converted into a video stream for presentation on display 210. For example, if a customer has an ATSC 1.0 TV in their house and they are approved for an ATSC output, all the input transmissions will be converted into an ATSC 1.0 output on display 210. Converter device 205 may have a standard UI and be compatible with user applications (e.g., Roku products or Apple TV) to provide content to the user's device of choice.

In an embodiment, converter device 205 may switch the source of the input data between one or more video distribution protocols or input sources. The trigger to switch between different sources can be managed manually or automatically. For example, a weather event may cause a loss of a satellite 240 source input which will trigger the converter device 205 to switch to an alternative streaming source. Converter device 205 may measure parameters such as the signal quality, strength (e.g., signal to noise ratio (SNR)), bandwidth, or power level of the inputs from the transmission sources to determine whether to switch between sources. A switch in sources may be triggered by a value of one of the parameters falling below a threshold value. The triggers to switch sources may be coded into the software of the converter device 205. For example, converter device 205 detects the signal power level of the input source of OTA 225 falls to −70 dBm. The converter device can switch the input source to OTT 235 to maintain the viewing experience for the customer. In another embodiment, the converter device 205 selects the input source based on the measuring the signal quality of the available input sources. For example, when a user selects to watch a sporting event, the converter device 205 selects input source ATSC 3.0 220 to provide the content of the sporting event based on input source ATSC 3.0 220 having the highest measured signal quality for streaming the sporting event content of the available input sources. After a period of time, input source satellite 240 may have the highest measured signal quality of the available input sources. Converter device 205 can switch the input source from ATSC 3.0 220 to satellite 240 based on the measured signal quality.

In an embodiment, the user may indicate a preferred transmission source. Converter device 205 may prioritize the user preference and switch to the preferred transmission source when it is available. In an embodiment, a user preferred input source is OTT 235 and converter device 205 selects OTT 235 before selecting other input sources. In another embodiment, the converter device 205 selects the input source with the highest SNR of a list of preferred input sources. For example, when a user selects to watch a news broadcast, the converter device 205 selects input source wireless 245 (e.g., 5G) to provide the content of the news broadcast based on the input source wireless 245 having the highest SNR of the list of preferred input sources.

Switching between input sources may take place while the user is viewing content. However, there may be a timing issue, such as a timing offset, between the two input sources providing the same content. To provide a viewing experience to the user without the user's perception of the content changing, the converter device 205 may generate a forward-looking time coordination between the two inputs and delay and/or buffer, as necessary, the input(s) in order to align the presentation audio and video to mitigate service interruption. Delaying/buffering of audio and/or video content may involve aligning an input stream with the faster available input source. Each input source may have a built-in timing reference.

Additionally, the converter device 205 may perform frame-matching to compare the inputs to see if there are similarities in a scene from a frame. For example, the user is watching a sports game provided by a DVB 230 source and the input switches to a 5G 245 source. The 5G 245 source may provide data in the transmission faster than the DVB 230 source. The converter device 205 may delay or buffer the 5G 245 source to synchronize the timing of the input so the user does not detect the source switch while watching the sports game. In one example, signal buffering includes buffering technology within HLS and/or MPEG-DASH. In another example, a source switch may buffer until a comparatively-similar event occurs (e.g., display of intermediate blank or black frames, or display switching to a different camera view or angle). Converter device 205 may designate or tag a source, including the original transmission source, while switching between transmission sources. Tagging the original transmission sources allows for a point of reference while determining the timing offset to buffer between the inputs.

Figure 3:
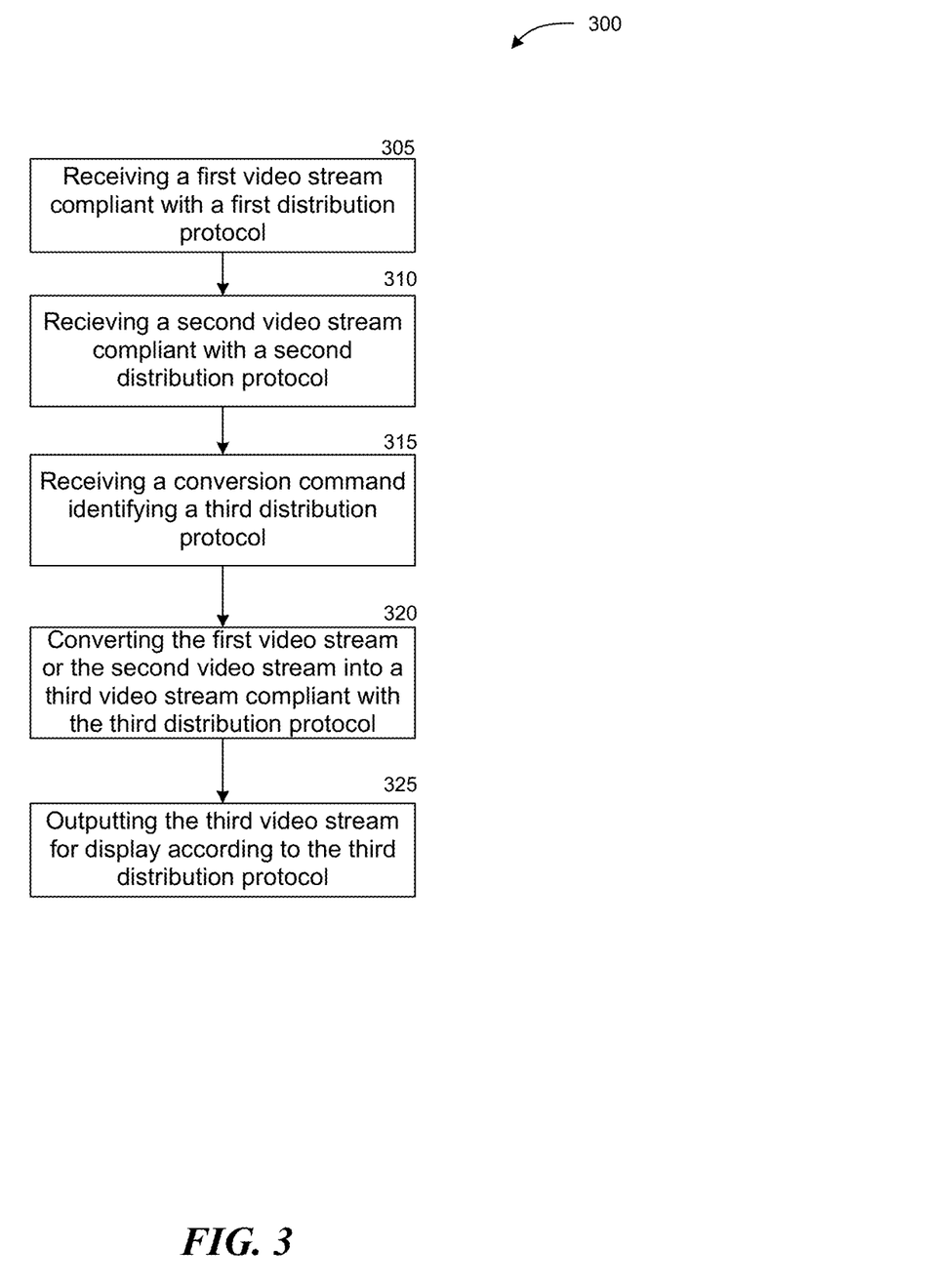
FIG. 3 is a flow diagram of an exemplary process for converting multiple video streams, according to an embodiment.

FIG. 3 illustrates an embodiment of process 300 of converting multiple video streams. The device converting the video streams may be a server device or client device. At step 305, the converter device may receive a first video stream compliant with a first distribution protocol. For example, a user selects to watch a movie, resulting in the converter device receiving the video stream of the movie compliant with an ATSC 3.0 protocol.

At step 310, the converter device may receive a second video stream compliant with a second distribution protocol. For example, the user selects to watch a sporting event, resulting in the converter device receiving the video stream of the sporting event compliant with a satellite protocol. In an embodiment, the first video steam and second video stream may contain the similar content such as the same sporting event. For example, the first video stream and the second video stream are both of the same sporting event but provided according to different distribution protocols such as satellite and ATSC 3.0.

At step 315, the converter device may receive a conversion command identifying a third distribution protocol. For example, the video content may be displayed for on the device of a user according to a third distribution protocol (e.g., ATSC 1.0 protocol).

In an embodiment, the converter device may determine to switch from the first distribution protocol to the second distribution protocol based on determining signal quality or signal strength. For example, the signal quality of the video stream of the sporting event from the satellite input may decrease below a threshold, resulting in the converter device switching to ATSC 3.0 protocol to provide the video stream of the sporting event. However, the timing of the two video streams provided by ATSC 3.0 and satellite inputs may not be aligned. In an embodiment, the converter device may measure a time offset between the first distribution protocol and the second distribution protocol. For example, there may be a time offset between the video stream of the sports game provided according to the satellite protocol and the video stream provided according to the ATSC 3.0 protocol. The time offset may result in a negative user experience when the video stream switches between protocols.

The converter device may generate a forward-looking time coordinated conversion between the first distribution protocol and the second distribution protocol based on the time offset. The time coordinated conversion may be used to determine the alignment of the presentation audio and video to mitigate service interruption. In some instances, the converter device may buffer the first video stream (e.g., compliant with satellite) or the second video stream (e.g., compliant with ATSC 3.0) to align timing to display the third video stream without a timing delay appearing on the user's display. In an embodiment, the converter device may tag the first distribution protocol as a transmission source.

At step 320, the converter device may convert the first video stream or the second video stream into a third video stream compliant with the third distribution protocol. For example, the converter device may convert video streams from input sources into an ATSC 1.0 protocol which is compliant with the device of the user.

At step 325, the converter device may output the third video stream for display according to the third distribution protocol. For example, the sporting event is displayed on the device of the user according to ATSC 1.0 protocol.

Figure 4:
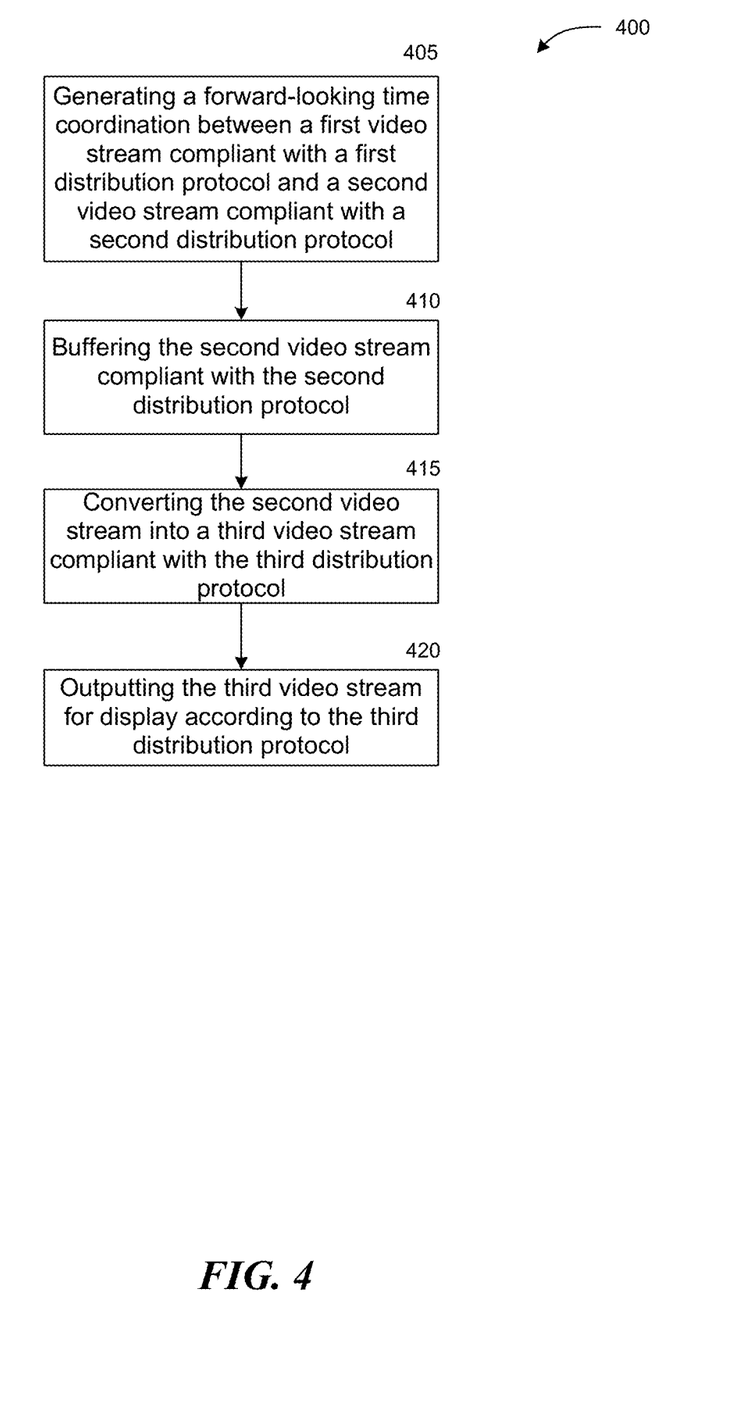
FIG. 4 is a flow diagram of an exemplary process for converting multiple video streams, according to an embodiment.

FIG. 4 illustrates an embodiment of process 400 of converting multiple video streams. The device converting the video streams may be a server device or client device. In an embodiment, the converter device may determine to switch from the first distribution protocol to the second distribution protocol however, the timing of the two video streams may not be aligned. For example, a news broadcast may be steamed according to a DVB or 5G protocol. The user may notice a timing offset in the news broadcast during the switch from DVB to 5G.

At step, 405, the converter device may generate a forward-looking time coordination between the first video stream compliant with a first distribution protocol and a second video stream compliant with a second distribution protocol. The forward-looking time coordination may be used to determine how to align the offset between the two video streams. For example, a 5G video stream may provide the data of the news broadcast faster than the data in a DVB video stream.

At step 410, the converter device may buffer the second video stream compliant with a second distribution protocol to align or synchronize the timing with the first video stream. For example, the converter device may delay and/or buffer, as necessary, the video stream compliant with 5G input in order to align the presentation of audio and video with the video stream compliant with DVB input. The alignment may mitigate service interruption, so the viewer does not notice the switch from DVB to 5G while watching the news broadcast. In an embodiment, the converter device may perform frame-matching to compare the input video streams to see if there are similarities in a scene from a frame. In some instances, the input sources may have a built-in timing reference which can be used to align the video streams compliant with different protocols.

In one example, signal buffering includes buffering technology within HLS and/or MPEG-DASH. In another example, a source switch may buffer until a comparatively-similar event occurs (e.g., display of intermediate blank or black frames, or display switching to a different camera view or angle). The converter device may designate or tag source, including the original transmission source, while switching between transmission sources. Tagging the original transmission sources allows for a point of reference while determining the timing offset to buffer between the inputs.

At step 415, the converter device may convert the second video stream into the third video stream compliant with the third distribution protocol. For example, the converter device may convert the buffered video stream compliant with the 5G protocol into a video stream compliant with an ATSC 1.0 protocol on the device of the user.

At step 420, the converter device may output the third video stream for display according to the third distribution protocol. For example, the news broadcast is displayed on the device of the user according to ATSC 1.0 protocol.

Figure 5:
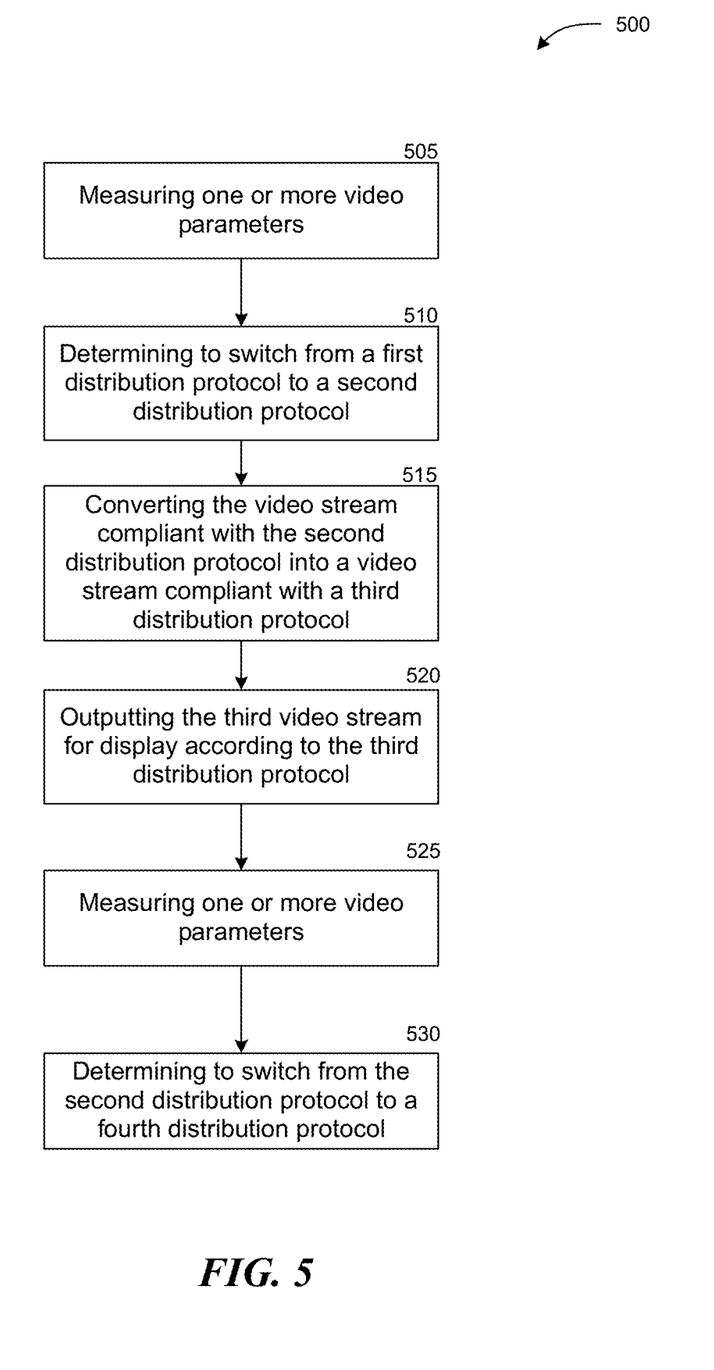
FIG. 5 is a flow diagram of an exemplary process for converting multiple video streams, according to an embodiment.

FIG. 5 illustrates an embodiment of process 500 of converting multiple video streams. The device converting the video streams may be a server device or client device. At step 505, the converter device may measure parameters such as the signal quality, signal strength (e.g., SNR), bandwidth, or power level of a variety of inputs sources to convert to output content. At step 510, the converter device may determine to switch between a first and second input source. A switch in input sources may be triggered by a value of one of the parameters falling below a threshold value. For example, the converter device may switch from a DVB input source to a 5G input source based on the SNR of DVB input source falling below 24 dB. The triggers to switch sources may be coded into the software of the converter device.

At step 515, the converter device may convert the second video stream into the third video stream compliant with the third distribution protocol. For example, the converter device may convert the video stream compliant with the 5G protocol into a video stream compliant with an ATSC 1.0 protocol on the device of the user. At step 520, the converter device may output the third video stream for display according to the third distribution protocol.

At 525, the converter device may remeasure the parameters of the variety of inputs sources providing data to convert to output content. At step 530, the converter device may determine to switch between the second and third input source. For example, the converter device may switch from the 5G input source to a satellite input source based on the 5G input source dropping a threshold number of data packets. The converter device may convert the video stream compliant with the fourth video protocol into the third video stream compliant with the third distribution protocol. For example, the converter device may convert the video stream compliant with the satellite protocol into a video stream compliant with an ATSC 1.0 protocol on the device of the user. The converter device may output the third video stream for display according to the third distribution protocol.

Figure 6:
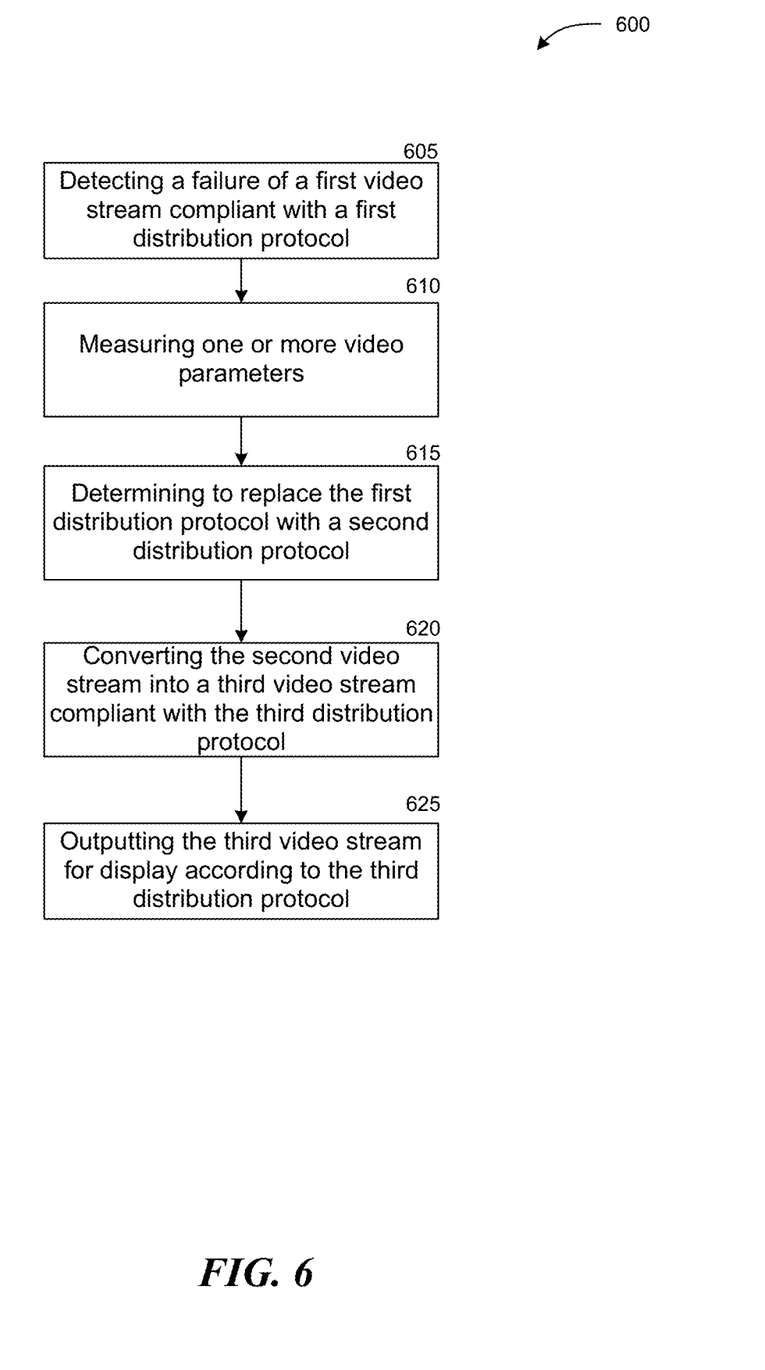
FIG. 6 is a flow diagram of an exemplary process for converting multiple video streams, according to an embodiment.

FIG. 6 illustrates an embodiment of process 600 of converting multiple video streams. The device converting the video streams may be a server device or client device. At step 605, the converter device may detect a failure of a first video stream compliant with a first distribution protocol. For example, a 5G input source may fail to provide content due to the user device moving into an area with a weak signal. At step 610, the converter device may measure parameters such as the signal quality, signal strength (e.g., SNR), bandwidth, or power level of available inputs sources to replace the failed input source. At step 615, the converter device may determine to replace the first distribution protocol with a second distribution protocol. For example, the converter device may select an ATSC 3.0 input source based on the ATSC 3.0 input source having the highest power level of the available input sources.

At step 620, the converter device may convert the second video stream into the third video stream compliant with the third distribution protocol. For example, the converter device may convert the video stream compliant with the ATSC 3.0 protocol into a video stream compliant with an ATSC 1.0 protocol on the device of the user. At step 625, the converter device may output the third video stream for display according to the third distribution protocol.

In an embodiment, when an input source fails, the converter device may automatically replace the failed input source with an OTA input source. The OTA input source may be a default replacement based on the reliability and signal quality of the OTA input source. In another embodiment, the converter device may automatically replace the failed input source with an OTA input source, while the converter device measures parameters of the available input sources.

Figure 7:
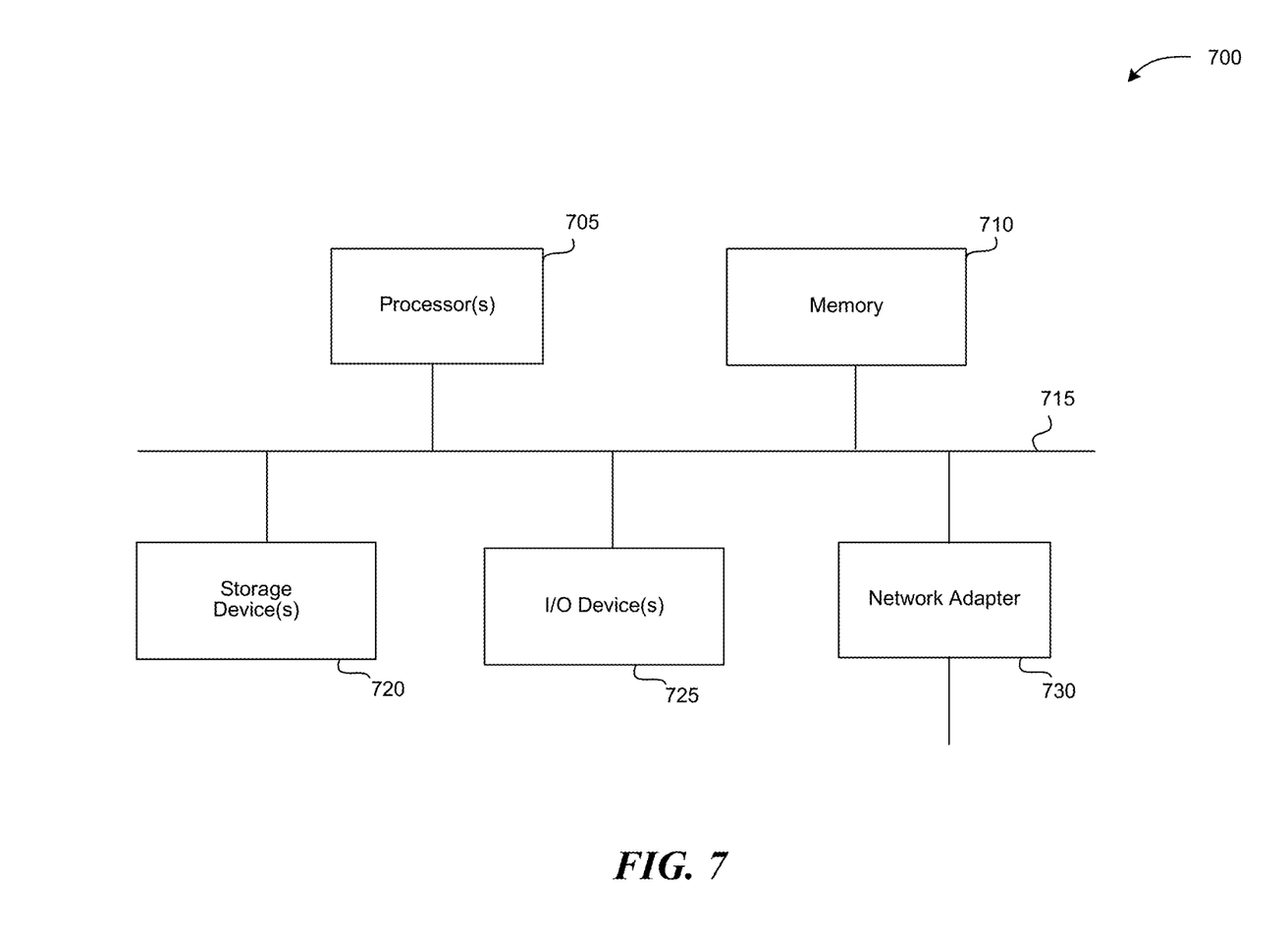
FIG. 7 is a block diagram of a processing system that can implement operations of the disclosed embodiments.

FIG. 7 is a block diagram of a computer system as may be used to implement features of the disclosed embodiments. The computer system 700 may be used to implement any of the entities, components or services depicted in the examples of the foregoing figures (and any other components described in this specification). The computer system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the computer system 700 by downloading it from a remote system through the computer system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method of converting multiple streams of video within a multi-mode conversion device communicatively coupled to a display, comprising:
   receiving a first video stream compliant with a first distribution protocol;
   receiving a second video stream compliant with a second distribution protocol;
   receiving a conversion command identifying a third distribution protocol;
   converting the first video stream into a third video stream compliant with the third distribution protocol;
   outputting the third video stream for display according to the third distribution protocol;
   determining to switch from the first distribution protocol to the second distribution protocol based on a signal quality;
   buffering the first video stream or the second video stream to align timing to display the third video stream without a timing delay to a user; and
   converting the second distribution protocol into the third distribution protocol.

2. The method of claim 1, further comprising:
   measuring a time offset between the first distribution protocol and the second distribution protocol.

3. The method of claim 2, further comprising:
   generating a forward-looking time coordinated conversion between the first distribution protocol and the second distribution protocol based on the time offset.

4. The method of claim 3, wherein the forward-looking time coordinated conversion further comprises:
   determining signal quality or signal strength of the first distribution protocol and the second distribution protocol.

5. The method of claim 1, further comprising:
   tagging the first distribution protocol as a transmission source.

6. The method of claim 1, wherein the first distribution protocol, the second distribution protocol, or the third distribution protocol are selected from a group of protocols consisting of an advanced television system committee (ATSC) protocol, an over the top (OTT) protocol, a digital video broadcasting (DVB) protocol, a satellite protocol, a fifth-generation mobile network protocol.

7. A system comprising:
   a server including at least one processor and a memory, the memory storing instructions executable by the at least one processor such that the at least one processor is programmed to:
   receive a first video stream compliant with a first distribution protocol;
   receive a second video stream compliant with a second distribution protocol;
   receive a conversion command identifying a third distribution protocol;
   convert the first video stream into the third video stream compliant with a third distribution protocol;
   output the third video stream for display according to the third distribution protocol;
   determine to switch from the first distribution protocol to the second distribution protocol based on a signal quality;
   buffer the first video stream or the second video stream to align timing to display the third video stream without a timing delay to a user; and
   convert the second distribution protocol into the third distribution protocol.

8. The system of claim 7, wherein the at least one processor is further programmed to:
   measure a time offset between the first distribution protocol and the second distribution protocol.

9. The system of claim 8, wherein the at least one processor is further programmed to:
   generate a forward-looking time coordinated conversion between the first distribution protocol and the second distribution protocol based on the time offset.

10. The system of claim 9, wherein the at least one processor is further programmed to:
    determine signal quality or signal strength of the first distribution protocol and the second distribution protocol.

11. The system of claim 7, wherein the at least one processor is further programmed to:
    tag the first distribution protocol as a transmission source.

12. The system of claim 7, wherein the first distribution protocol, the second distribution protocol, or the third distribution protocol are selected from a group of protocols consisting of an advanced television system committee (ATSC) protocol, an over the top (OTT) protocol, a digital video broadcasting (DVB) protocol, a satellite protocol, a fifth-generation mobile network protocol.

13. An apparatus for converting multiple streams of video and displaying media content communicatively coupled to a display, comprising:
    a memory;
    one or more processors electronically coupled to the memory and configured for:
    receiving a first video stream compliant with a first distribution protocol;
    receiving a second video stream compliant with a second distribution protocol;
    receiving a conversion command identifying a third distribution protocol;
    converting the first video stream into the third video stream compliant with a third distribution protocol;
    outputting the third video stream for display according to the third distribution protocol;
    determining to switch from the first distribution protocol to the second distribution protocol based on a signal quality;
    buffering the first video stream or the second video stream to align timing to display the third video stream without a timing delay to a user; and
    converting the second distribution protocol into the third distribution protocol.

14. The apparatus of claim 13, wherein the one or more processors are further configured for:
    measuring a time offset between the first distribution protocol and the second distribution protocol.

15. The apparatus of claim 14, wherein the one or more processors are further configured for:
    generating a forward-looking time coordinated conversion between the first distribution protocol and the second distribution protocol based on the time offset.

16. The apparatus of claim 15, wherein the one or more processors are further configured for:
    determining signal quality or signal strength of the first distribution protocol and the second distribution protocol.

17. The apparatus of claim 13, wherein the one or more processors are further configured for:

tagging the first distribution protocol as a transmission source.

* * * * *